United States Patent
Cook

(10) Patent No.: US 7,162,523 B1
(45) Date of Patent: Jan. 9, 2007

(54) ENFORCING A COMMUNICATION ARCHITECTURE IN A COMMUNICATION NETWORK

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 828 days.

(21) Appl. No.: 10/114,190

(22) Filed: Apr. 1, 2002

(51) Int. Cl.
*G06F 15/173* (2006.01)

(52) U.S. Cl. ...................... 709/224; 709/223

(58) Field of Classification Search ............... 709/223, 709/224, 225, 226, 102, 104; 379/201
See application file for complete search history.

(56) References Cited

U.S. PATENT DOCUMENTS

| | | | |
|---|---|---|---|
| 5,550,816 A * | 8/1996 | Hardwick et al. | 370/397 |
| 6,724,875 B1 * | 4/2004 | Adams et al. | 379/201.01 |
| 6,754,181 B1 * | 6/2004 | Elliott et al. | 370/252 |
| 6,901,440 B1 * | 5/2005 | Bimm et al. | 709/223 |
| 6,948,000 B1 * | 9/2005 | Desai et al. | 709/245 |

OTHER PUBLICATIONS

Natarajan, N.; Flinck, Hannu; Rosli, R. M., "Network Resource Information Model Specification," Version 3.00 Telecommunications Information Networking Architecture Consortium, NRIM_v3.0_97_12_17, Dec. 17, 1997.

* cited by examiner

*Primary Examiner*—Saleh Najjar
*Assistant Examiner*—V. Korobov

(57) ABSTRACT

A control interface enforces a network architecture in a communication network by utilizing states and state transitions for logical elements and network devices. The control interface includes states of logical elements, maps of the logical elements, states of network devices, and maps of the network devices. The logical elements represent sets of network device functions. The control interface receives an event. The control interface processes the event to identify one of the logical elements and at least one of the network devices. The control interface then updates the first state for the identified logical element based on the event and one of the first maps of the identified logical element. The control interface updates the second state for the identified network device based on the event and one of the second maps of the identified network device.

45 Claims, 12 Drawing Sheets

Logical Components of NRIM Enforcement

FIG. 6 : Logical Components of NRIM Enforcement

ENFORCING A COMMUNICATION ARCHITECTURE IN A COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication networks, and in particular, to a system that enforces a communication architecture in a communication network.

2. Description of the Prior Art

Communication service providers provide their communication services by utilizing many network devices such as switches and multiplexers. The organization and management of a communication network is critical due to numerous communication services and a variety of network devices. The International Telecommunication Union Telecommunication Standardization Sector (ITU-T) has developed a standard to delineate the provisioning of the communication service into layers. This standard is called the Telecommunication Management Network (TMN) standard.

FIG. 1 depicts a block diagram of a system that includes Telecommunication Management Network (TMN) layers 100 in the prior art. The TMN layers 100 are separated into a service management 110, a network management 120, a network element management 130, and a network element layer 140. The service management 110 provides customer interfaces, interacts with other services, and interacts with the network management 120. The network management 120 manages all the network elements using the network management capabilities presented by the network element management 130. The network element management 130 manages all the specific network elements in the network element layer 140.

The Telecommunications Information Networking Architecture Consortium (TINA-C) developed a TINA architecture to support multimedia and multipoint communication sessions. In this TINA architecture, the TINA-C developed a model to handle the network management 120 and network element management 130. This model is called the Network Resource Information Model (NRIM) Specification. The NRIM provides the following network resource management functions: Network Topology Configuration Management, Connection Management, Fault Management, and Accounting Management.

FIG. 2 depicts a block diagram of a communication network in the prior art. In FIG. 2, the communication service manager 210 provides the management of communication services. The communication service manager 210 exchanges commands with the control interface 220 to control the provisioning of the communication service through the network devices 232, 234, and 236. The control interface 220 translates the commands to the protocols of the network devices 232, 234, and 236.

One problem is the network devices are built with varying protocols and standards by various manufactures. The service logic in the communication service manager 210 then includes vendor-dependent commands and protocols. Thus, the service logic is not portable using different network devices. Also, modifications and enhancements to the network devices commands and protocol have to be duplicated in the service logic. Another problem is the network architectures such as TMN layers and NRIM are not enforced. Network devices and service logic then do not have to comply with the standards set out in the TMN layers and the NRIM architecture. More generally, secondary service logic modifies element configuration/state without notifying the primary service logic, which invalidates the "resource" view maintained by the primary service logic.

SUMMARY OF THE INVENTION

The invention solves the above problems by operating a control interface to enforce a network architecture in a communication network. The control interface includes states of logical elements, maps of the logical elements, states of network devices, and maps of the network devices. The logical elements represent sets of network device functions. The control interface receives an event. The control interface processes the event to identify one of the logical elements and at least one of the network devices. The control interface then updates the first state for the identified logical element based on the event and one of the first maps of the identified logical element. The control interface updates the second state for the identified network device based on the event and one of the second maps of the identified network device.

In one embodiment, the control interface executes an action based on the state and the map in response to updating the state. In another embodiment, the control interface transfers the event from the control interface to the identified network device. In yet another embodiment, the event is a request for service from a communication service manager. In one embodiment, the control interface configures the identified logical element based on the event. In another embodiment, the control interface configures the identified network device based on the event.

By utilizing state transitions, the invention advantageously enforces a network architecture implemented in the maps of the logical elements and network devices. Thus, logical elements and network devices will only transition to approved states. In some embodiments, the control interface enforces TMN layers and NRIM architectures through the state transitions of the logical elements and network devices. Also, the logic of the communication service manager is independent from the varying protocols of the network devices. Service logic then only needs to reference the capabilities of the network devices through the logical elements.

A particular reference number in one figure refers to the same element in all of the other figures.

DETAILED DESCRIPTION OF THE INVENTION

Figure 1:
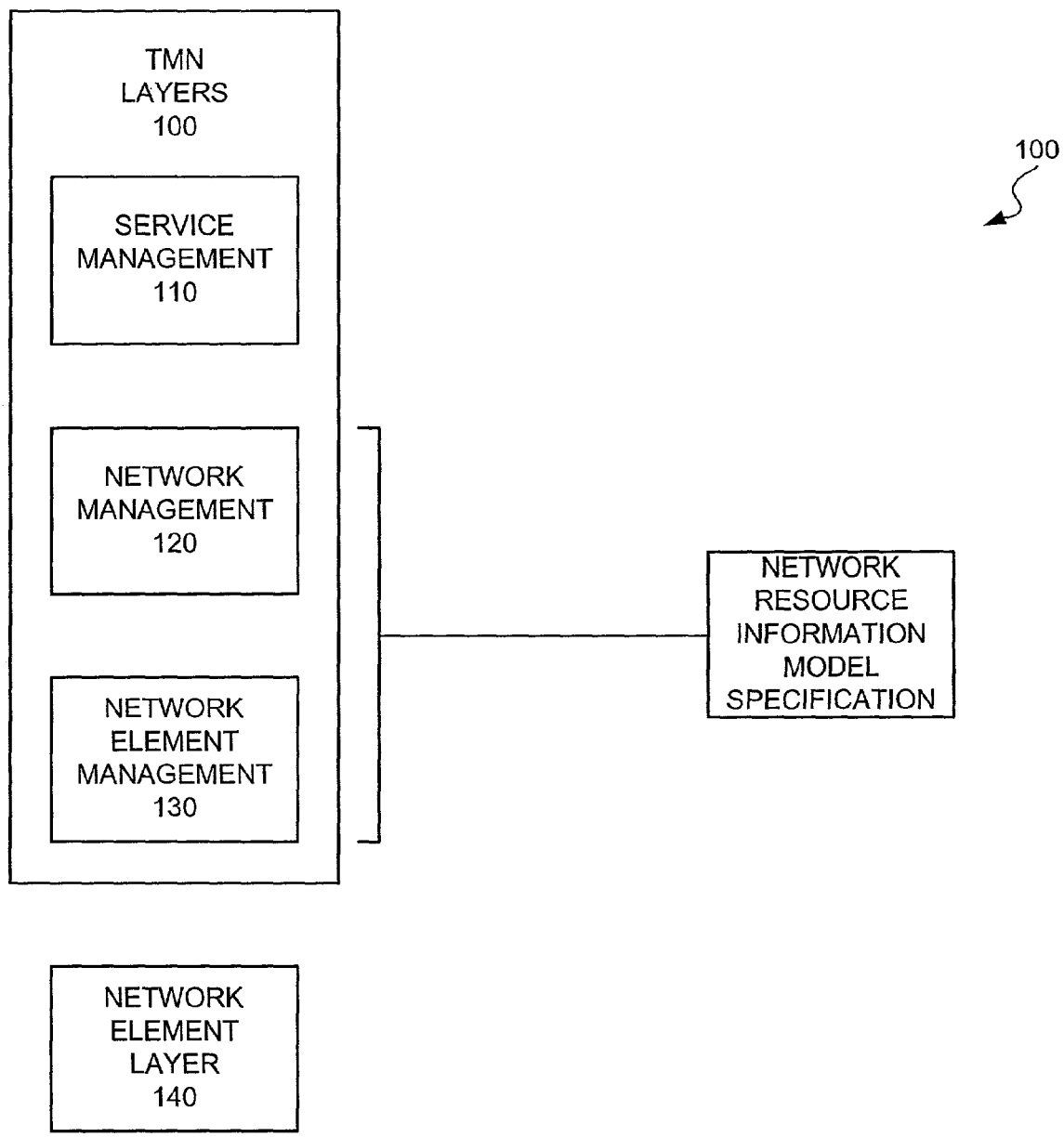
FIG. 1 is a block diagram of a system that includes Telecommunication Management Network (TMN) layers in the prior art.
Figure 2:
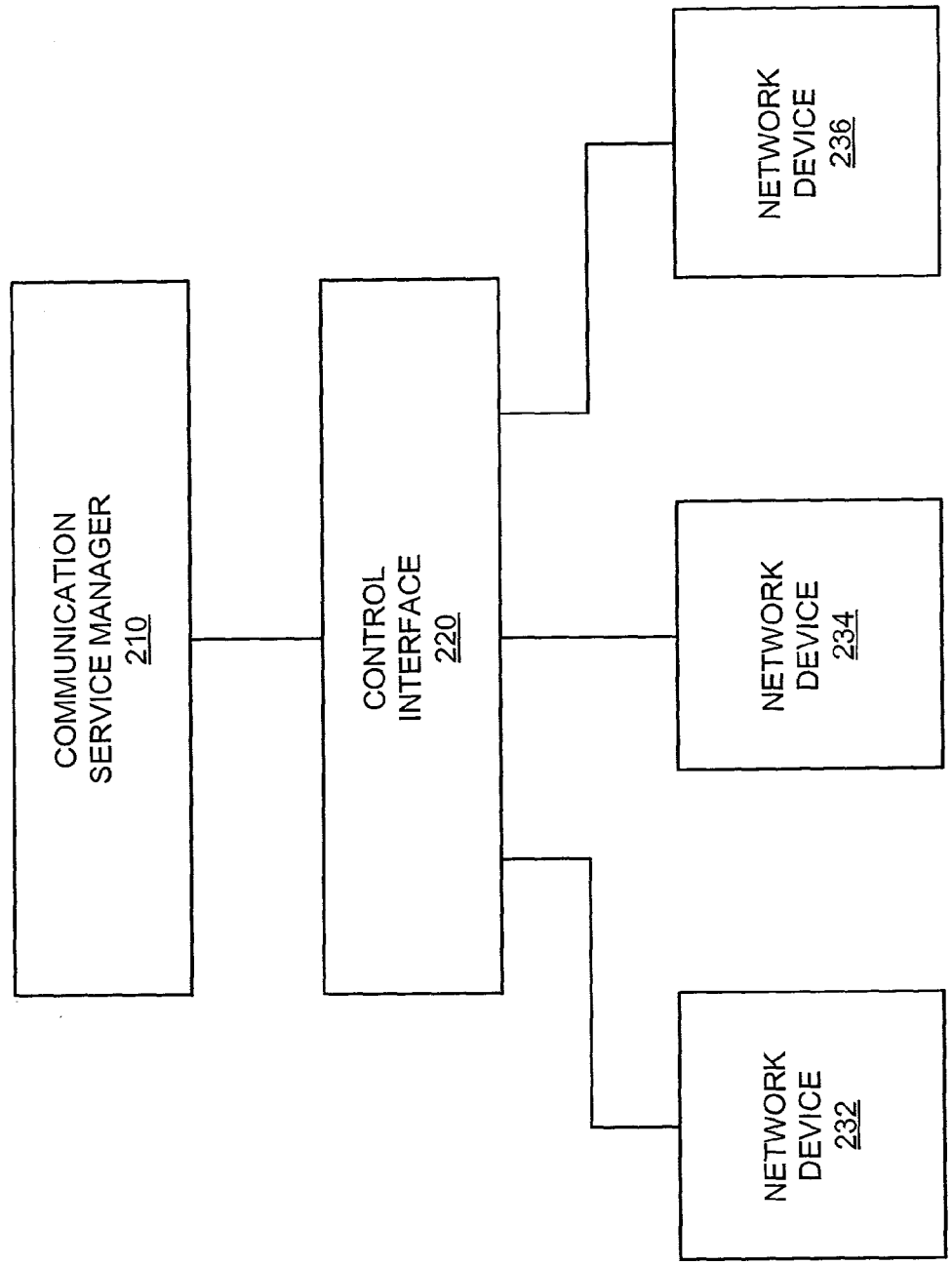
FIG. 2 is a block diagram of a communication network in the prior art.
Figure 3:
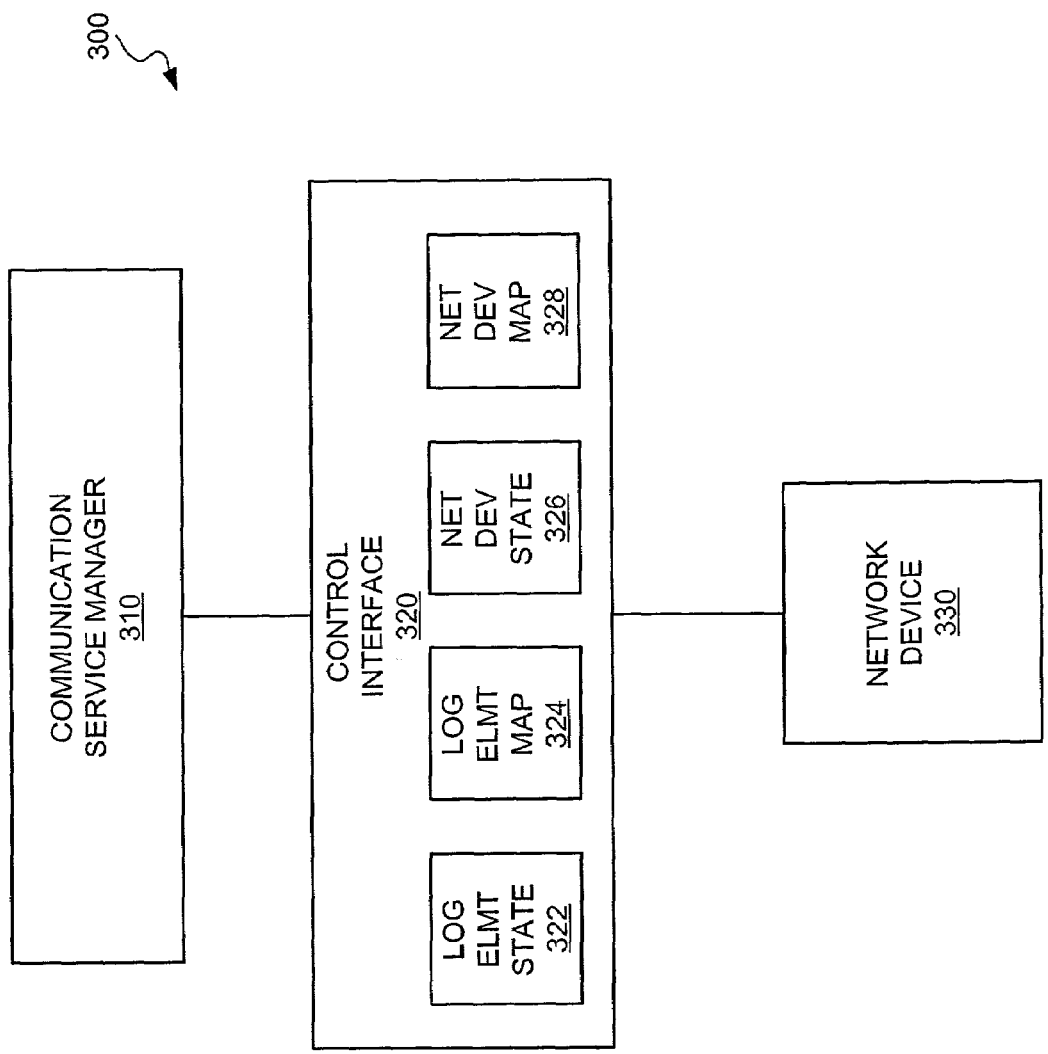
FIG. 3 is a block diagram of a communication network in an example of the invention.
Figure 4:
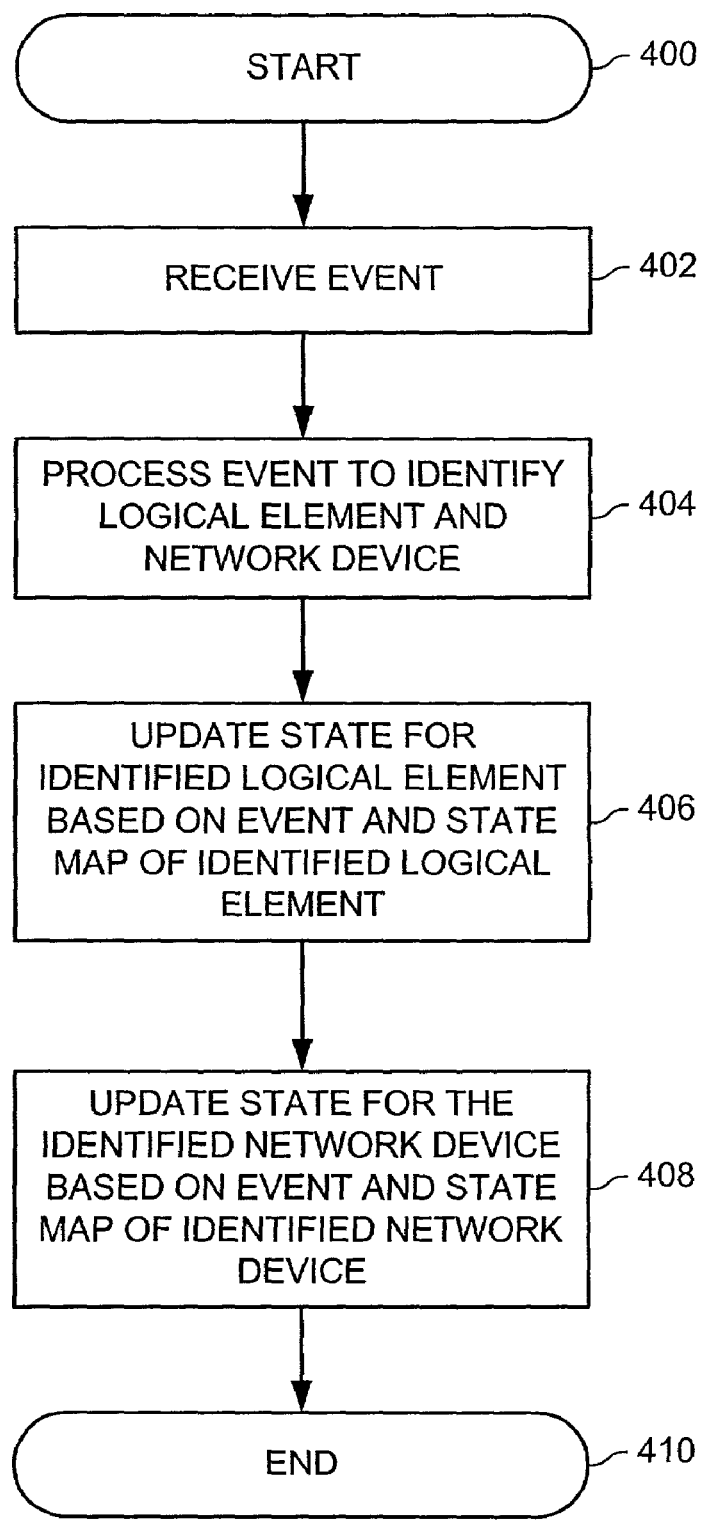
FIG. 4 is a flow chart for the control interface in an example of the invention.

Communication Network—FIG. 3–4

FIG. 3 depicts a block diagram of a communication network 300 in an example of the invention. The communication network 300 comprises a communication service manager 310, a control interface 320, and a network device 330. The control interface 320 comprises a logical element state 322, a logical element map 324, a network device state 326, and a network device map 328. The communication service manager 310 is connected to the control interface 320. The control interface 320 is connected to the network device 330.

The communication service manager 310 could be any system or device configured to manage communication services to the user and generate and transmit events to the control interface 320. One example of the communication service manager 310 is the service system 530 discussed below in FIGS. 5–12. The control interface 320 could be any system or device configured to receive an event, process the event to identify one of the logical elements and at least one of the network devices, update the first state for the identified logical element based on the event and one of the first maps of the identified logical element, and update the second state for the identified network device based on the event and one of the second maps of the identified network device. In one embodiment, the control interface 320 comprises a processor and an interface. One example of the control interface is the NRIM enforcement device 520 discussed below in FIGS. 5–12.

An event could be any message, signaling, or information received into the control interface 320 related to the communication service manager 310 or the network device 330. One example of an event is a request for service from the communication system manager. Another example of an event is an unavailable indication or message from the network device 330. A state could be any situation or status of a process or device. A map is a representation of state transitions. In some embodiments, the map determines or describes actions for state transitions. In one embodiment, the state is a pointer on a map that signifies the situation or status of the process or device. In another embodiment, different logical elements or network devices share the same map.

An example of a map is shown in the following table:

| States | Events | | | |
| --- | --- | --- | --- | --- |
|  | Event 1 | Event 2 | Event 3 | Event 4 |
| State A | B | C | A | A |
| State B | A | B | B | Illegal |
| State C | Illegal | B | A | A |

In one example, if a device is in state A and event 2 occurs, the state is transitioned to state C. This map also shows how certain state transitions are illegal. In some embodiments, the actions to be performed upon state transitions are included with the new state established.

The logical element could be any logical representation of a network device, a group of network devices, or network device functions. In one embodiment, the logical element could be a representation of a group of capabilities of similar network devices. One embodiment of the logical element is an element controller in FIG. 6.

The network device 330 could be any device configured to provide communication services and generate and transmit events to the control interface 320. Some examples of network devices are switches and multiplexers. Those skilled in the art will understand that multiple network devices 330 could be attached to the control interface 320 but are not shown for the sake of simplicity.

FIG. 4 depicts a flow chart for the control interface 320 in an example of the invention. FIG. 4 begins in step 400. In step 402, the control interface 320 receives an event. The control interface 320 receives the event from either the communication service manager 310 or the network device 330. In step 404, the control interface 320 processes the event to identify a logical element and the network device 330. In step 406, the control interface 320 updates the state 322 for the identified logical element based on the event and the state maps 324 of the identified logical element. In step 408, the control interface 320 updates the state 326 for the network device 330 based on the event and the state map 328 of the network device 330. FIG. 4 ends in step 410.

By utilizing state transitions, the control interface 320 advantageously enforces a network architecture implemented in the maps. Thus, logical elements and network devices will only transition to approved states. Also, the logic of the communication service manager 310 is independent from the varying protocols of network devices. Service logic then only needs to reference the capabilities of the network devices through the logical elements. Thus, the service logic can be decoupled from the network implementation.

Communication Network with an NRIM Enforcement Device—FIGS. 5–12

FIGS. 5–12 disclose one exemplary embodiment of the invention, but the invention is not restricted to the configuration provided below. Those skilled in the art will appreciate numerous variations in configuration and operation of a communication network that are within the scope of the invention. Those skilled in the art will also appreciate how the principles illustrated in this example can be used in other examples of the invention.

Figure 5:
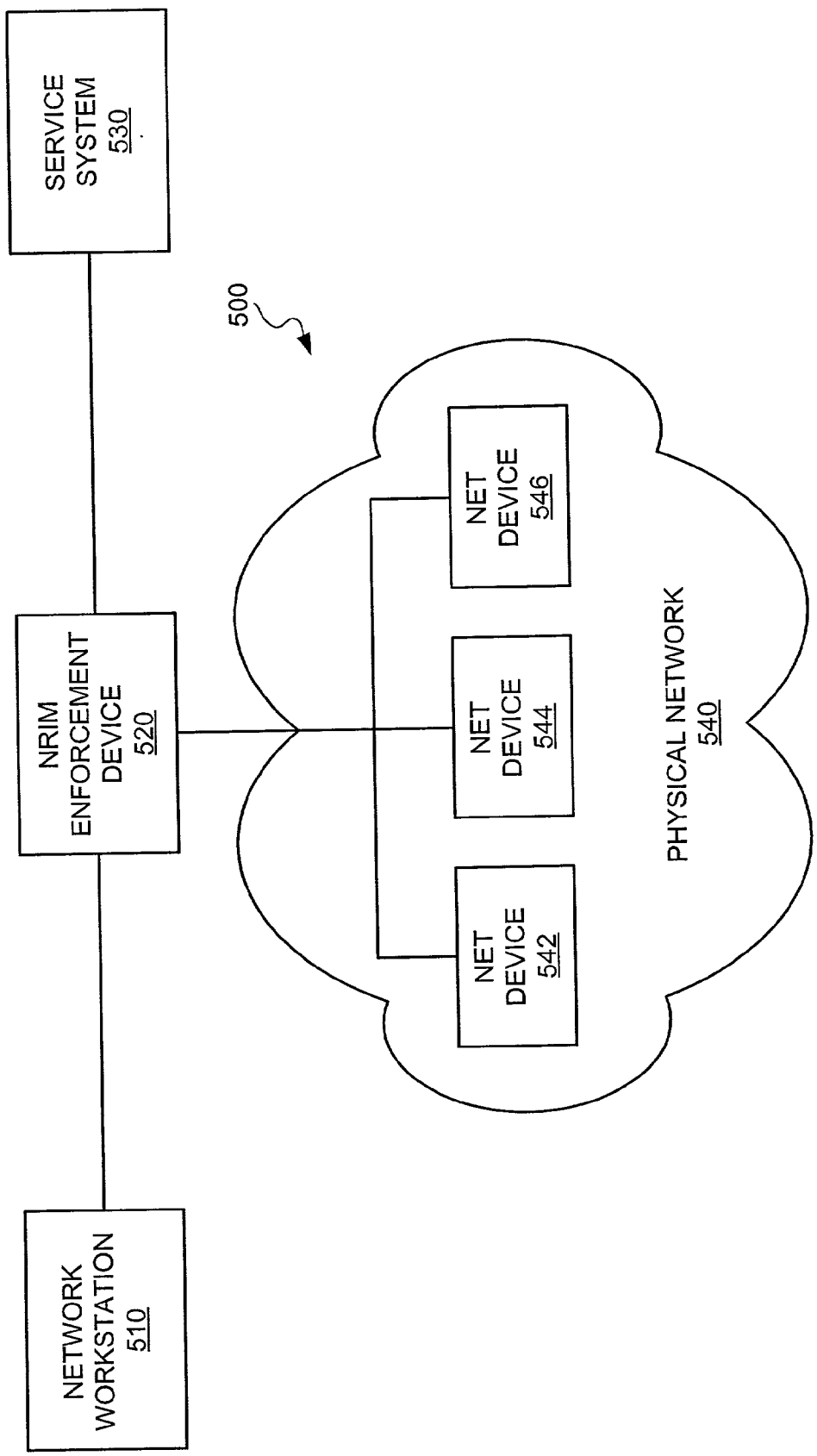
FIG. 5 is a block diagram of a communication network with a NRIM enforcement device in an example of the invention.

FIG. 5 depicts a block diagram of a communication network 500 with an NRIM enforcement device 520 in an example of the invention. The communication network 500 comprises a network workstation 510, the NRIM enforcement device 520, a service system 530, and a physical network 540. The physical network 540 comprises a network device 542, a network device 544, and a network device 546. The network workstation 510 is connected to the NRIM enforcement device 520. The NRIM enforcement device 520 is connected to the service system 530, the network device 542, the network device 544, and the network device 546. Those skilled in the art understand that numerous network workstations 510, service systems 530, and network devices 542–546 could be attached to the NRIM enforcement device 520 but are not pictured for the sake of clarity. The software contained within the NRIM enforcement device 520 is illustrated in greater detail in FIG. 6.

Figure 6:
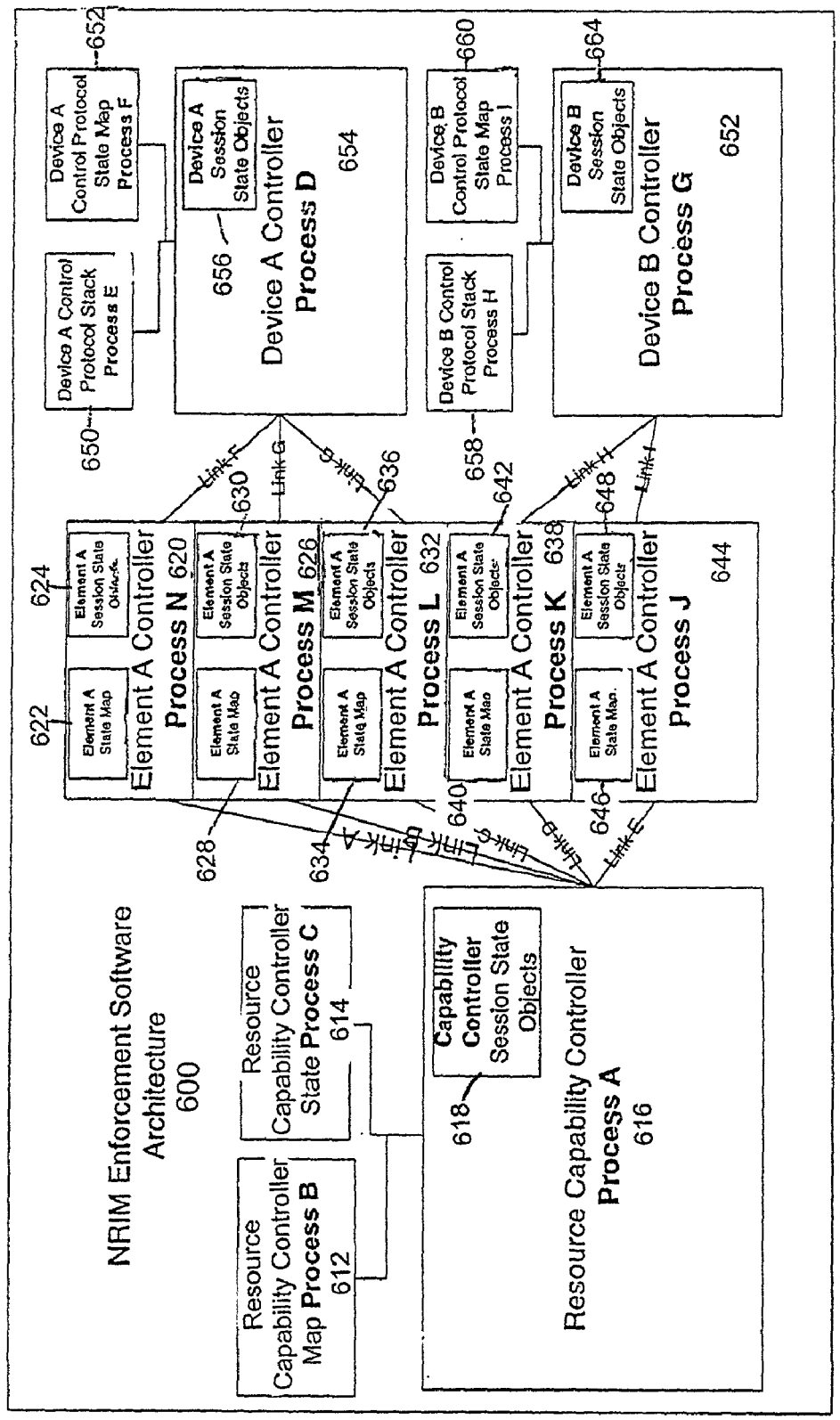
FIG. 6 is a block diagram of a NRIM enforcement software architecture in an example of the invention.

FIG. 6 depicts a block diagram of the NRIM enforcement software architecture 600 in an example of the invention. The NRIM enforcement software architecture 600 comprises a resource capability controller (RCC) map 612, an RCC state 614, an RCC 616, an element A controller process N 620, an element A controller process M 626, an element A controller process L 632, an element A controller process K 638, an element A controller process J 644, a device A control protocol stack process E 650, a device A control protocol state map process F 652, a device A controller process D 654, a device B control protocol stack process H 658, a device B control protocol state map process 1660, and a device B controller process G 662. Those skilled in the art understand that multiple controllers, maps, and session state objects may be included but are not shown for the sake of simplicity.

The RCC 616 comprises an RCC session state object 618. The element A controller process N 620 comprises an element A state map 622 and an element A session state object 624. The element A controller process M 626 comprises an element A state map 628 and an element A session state object 630. The element A process L 632 comprises an element A state map 634 and an element A session state object 636. The element controller process K 638 comprises an element A state map 640 and an element A session state object 642. The element controller process J 644 comprises an element A state map 646 and an element A session state object 648.

The RCC map 612 and the RCC state 614 are connected to the RCC 616. The RCC 616 is connected to the element A controller process N 620, the element A controller process M 626, the element A controller process L 632, the element A controller process K 638, and the element A controller process J 644. The element A controller process N 620, the element A controller process M 626, and the element A controller process L 632 are connected to the device A controller process D 654. The device A control protocol stack process E 650 and the device A control protocol state map 652 are connected to the device A controller process D 654. The element A controller process K 638 and the element A controller process J 644 are connected to the device B controller process G 662. The device B control protocol stack process H 658 and the device B control protocol state map process 1660 are connected to the device B controller process G 662.

The session state objects in FIG. 6 are objects that depict the state of the respective relationship between a requester and the network. The device A control protocol stack process E 650 and the device B control protocol stack process H 658 contain control protocols for the respective network device that the device controller is related to. FIGS. 7–12 depict flow charts for various processes of the RCC 616, element controllers, and device controllers including their state and state transitions. After receiving an event, the NRIM enforcement device 520 processes the event and identifies the related logical elements and network devices. The processes such as the RCC 616, element controllers, and device controllers update their state based on the respective map of the process and the event received. Also, the process may execute actions in the map associated with the state transition.

Figure 7:
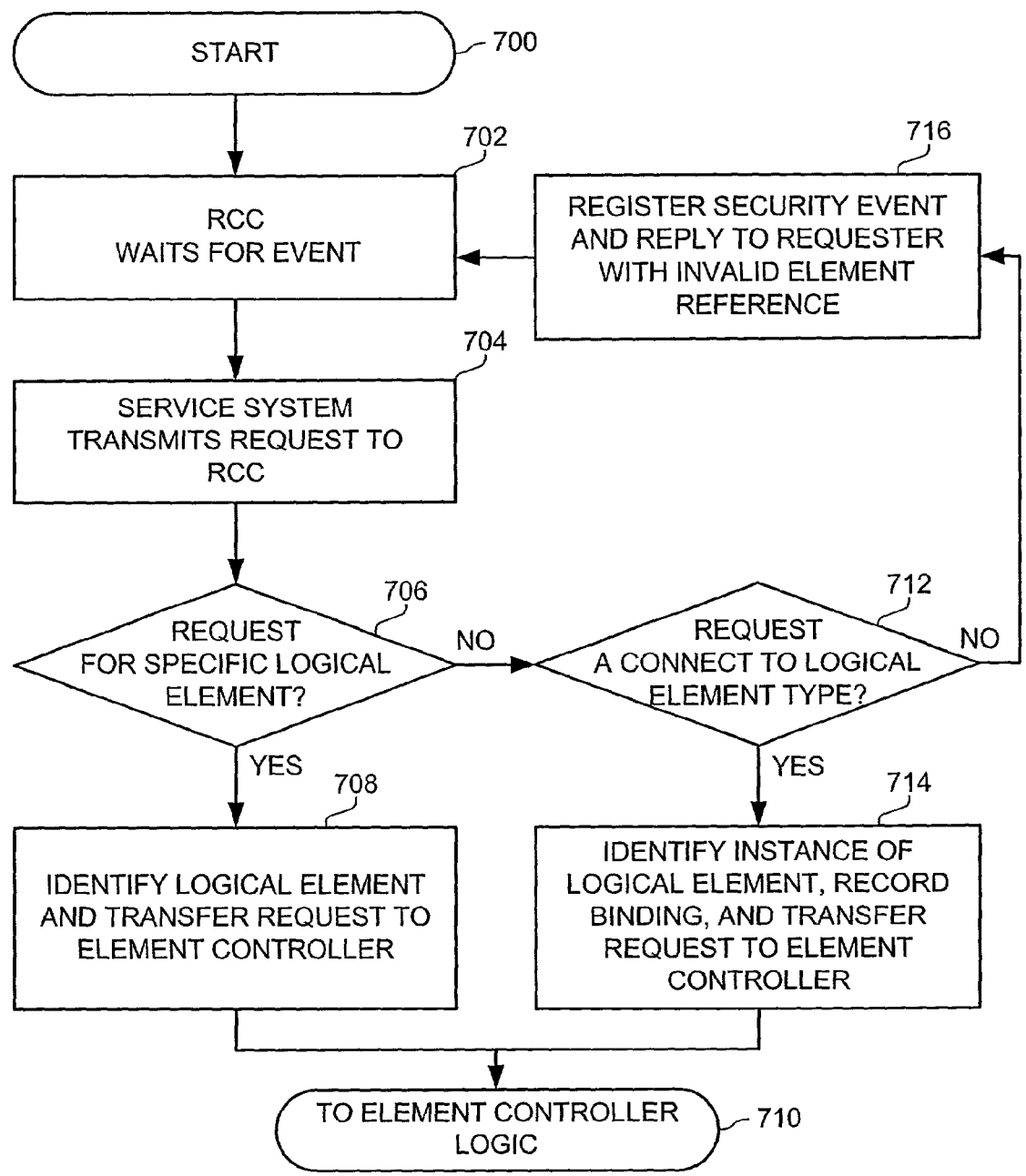
FIG. 7 is a flow chart of the resource capability controller for receiving a request from the service system in an example of the invention.

FIG. 7 depicts a flow chart of the RCC 616 for receiving a request from the service system 530 in an example of the invention. FIG. 7 begins in step 700. In step 702, the RCC 616 waits for an event. In step 704, the service system 530 then transmits a request to the RCC 616. In this embodiment, the request is a request for service using the network device 542. The RCC 616 then determines whether the request is for a specific logical element in step 706.

If the request is for a specific logical element, the RCC 616 identifies the specific logical element and transfers the request to the element controller for the specific logical element. In this embodiment, the logical element is element A. The element controller could be any one of the element A controller process N 620, the element A controller process M 626, the element A controller process L 632, the element A controller process K 638, and the element A controller process J 644. For this embodiment, the element controller is the element A controller process N 620. The process then proceeds to the element controller logic in step 710. The element controller logic is discussed below in FIG. 11.

If the request is not for a specific logical element 706, the RCC 616 determines whether the request is to connect to a logical element type. If the request is not to connect to a logical element type, the RCC 616 registers a security event and replies to the requester, which is the service system 530, with an invalid element reference in step 716 before returning to step 702. If the request is to connect to a logical element type, the RCC 616 identifies an instance of the logical element in step 714. The RCC 616 then records the binding and transfers the request to the element controller. The binding is the information associated with the grouping of the RCC 616, the specific request ID, the logical element, and the network device 542. For this embodiment, the logical element is element A and the element controller is the element A controller process N 620. The process then proceeds to the element controller logic in step 710. The element controller logic is discussed below in FIG. 11.

Figure 8:
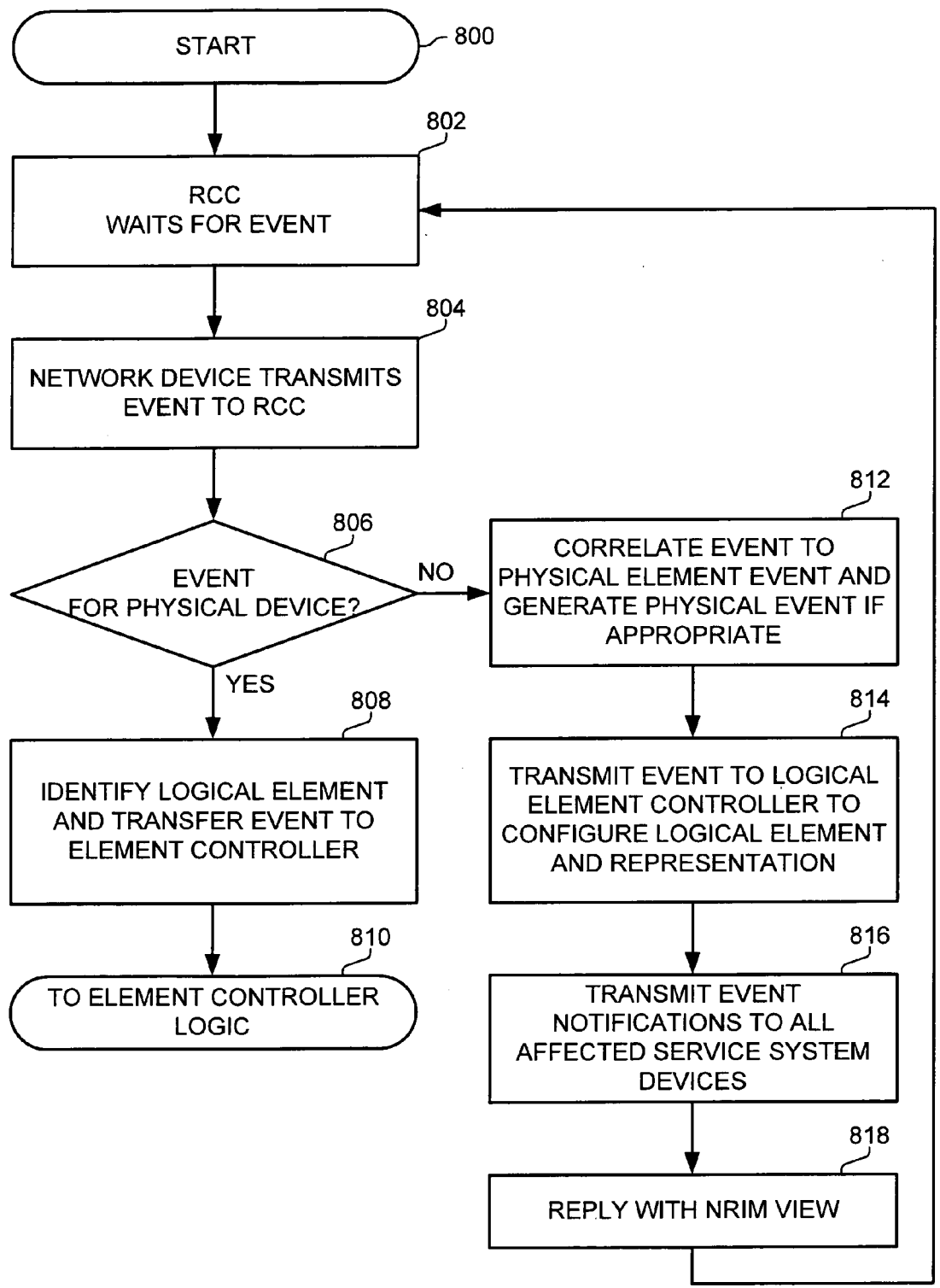
FIG. 8 is a flow chart of the resource capability controller for receiving an event from the network device in an example of the invention.

FIG. 8 depicts a flow chart of the RCC 616 for receiving an event from the network device 542 in an example of the invention. FIG. 8 begins in step 800. In step 802, the RCC 616 waits for an event. The network device 542 transmits the event to the RCC 616 in step 804. In other embodiments, the network device 542 could be any network device in the physical network 540. In step 806, the RCC 616 determines whether the event is for a physical device. If the event is for a physical device, the RCC 616 identifies the logical element and transfers the event to the element controller in step 808. The process then proceeds to element controller logic in step 810.

If the event is not for a physical device, the RCC 616 correlates the event to a physical element event and generates a physical event if appropriate in step 812. In step 814, the RCC 616 transmits the event to the logical element controller to configure the logical element and the representation of the logical element. The RCC 616 then transmits event notifications to all affected service system 530 devices in step 816. The RCC 616 then replies with an NRIM view in step 818 before returning to step 802.

Figure 9:
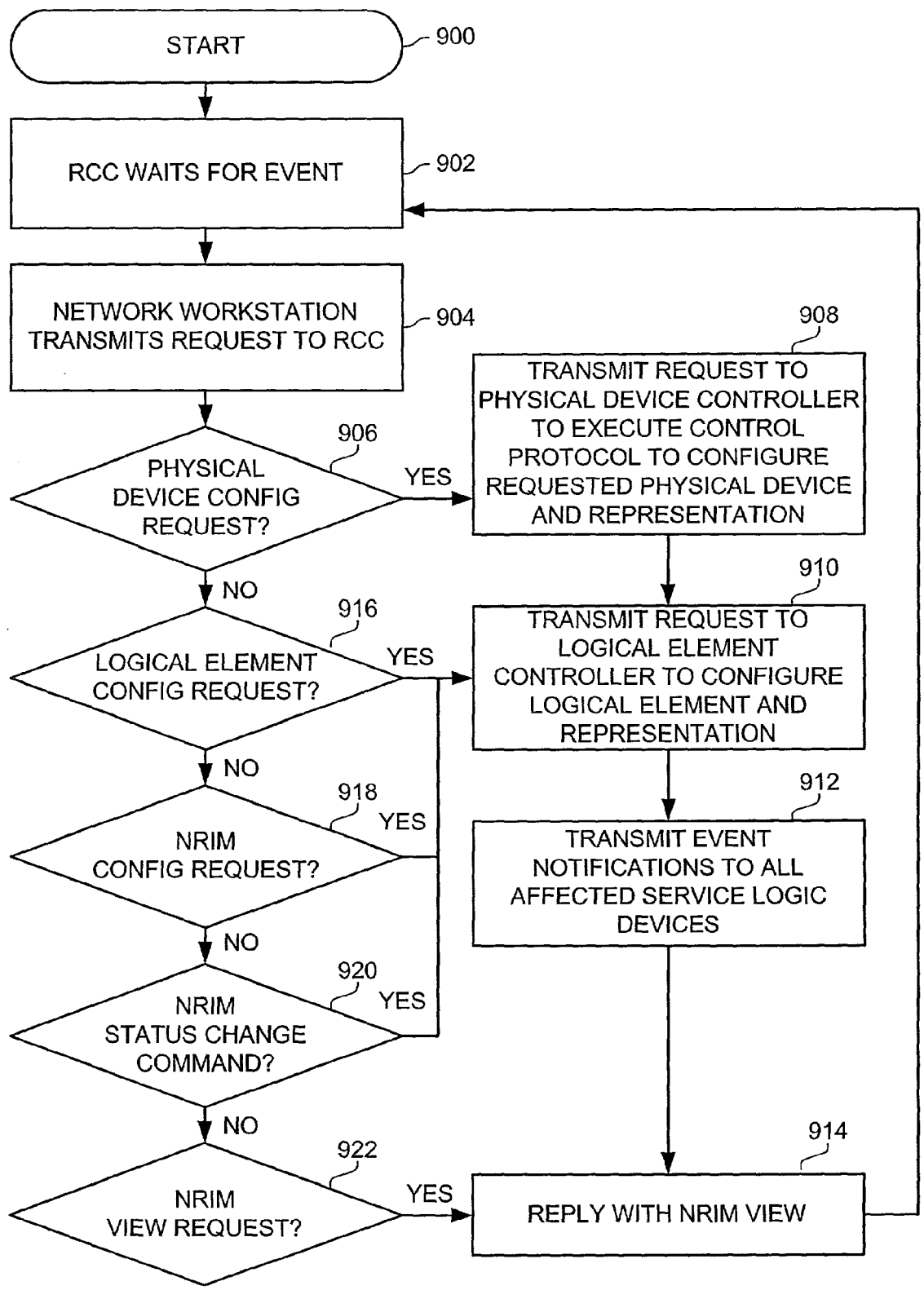
FIG. 9 is a flow chart of the resource capability controller for receiving an event from the network workstation in an example of the invention.

FIG. 9 depicts a flow chart of the RCC 616 for receiving an event from the network workstation 510 in an example of the invention. FIG. 9 begins in step 900. In step 902, the RCC 616 waits for an event. The network workstation 510 then transmits a request to the RCC 616 in step 904. In step 906, the RCC 616 determines whether the request is to configure a physical device.

If the request is to configure a physical device, the RCC 616 transmits a request to a physical device controller to execute a control protocol to configure a requested physical device and the representation of the physical device in step 908. In step 910, the RCC 616 transmits a request to a logical element controller to configure the logical element and the representation of the logical element. In step 912, the RCC 616 transmits event notifications to all affected service system 530 devices. The RCC 616 then replies with an NRIM view in step 914 before returning to step 902.

If the request is not to configure a physical device, the RCC 616 determines whether the request is to configure a logical element. If the request is to configure a logical element, the RCC 616 returns to step 910. If the request is not to configure a logical element, the RCC 616 determines whether the request is an NRIM configuration request in step 918. If the request is an NRIM configuration request, the RCC 616 returns to step 910. The RCC 616 then determines whether the request is an NRIM status change command in step 920. If the request is an NRIM status change command, the RCC 616 returns to step 910. If the request is not an NRIM status change command, the RCC 616 determines whether the request is for an NRIM view. If the request is for an NRIM view, the RCC 616 returns to step 914.

Figure 10:
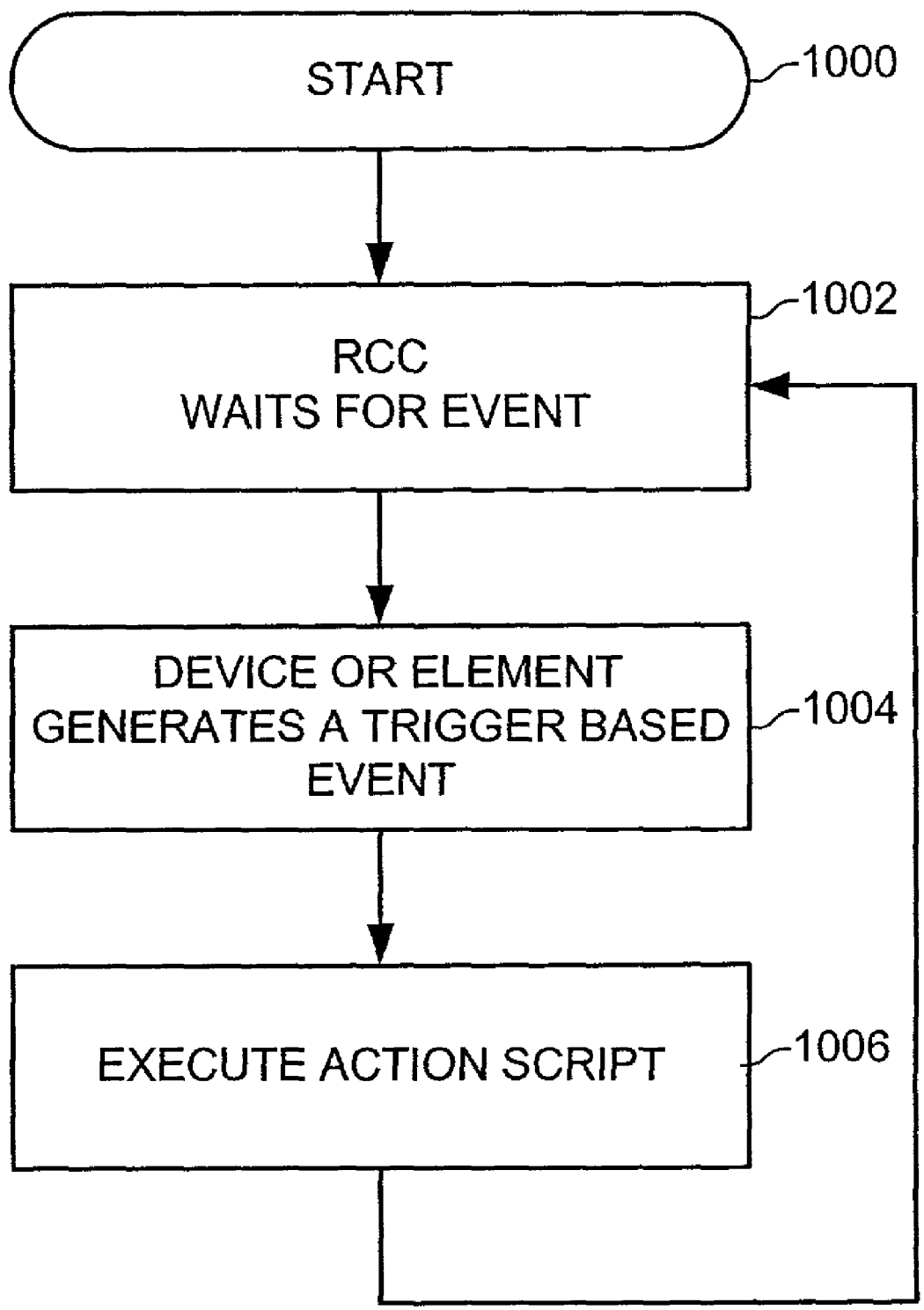
FIG. 10 is a flow chart of the resource capability controller for a trigger based event in an example of the invention.

FIG. 10 depicts a flow chart of the RCC 616 for a trigger based event in an example of the invention. FIG. 10 begins in step 1000. In step 1002, the RCC 616 waits for an event. In step 1004, the NRIM enforcement device 520 or the network devices 542–546 generates a trigger based event. The RCC 616 executes an action script based on the trigger based event in step 1006 before returning to step 1002. The action script is a sequenced list of actions to be executed for an event.

Figure 11:
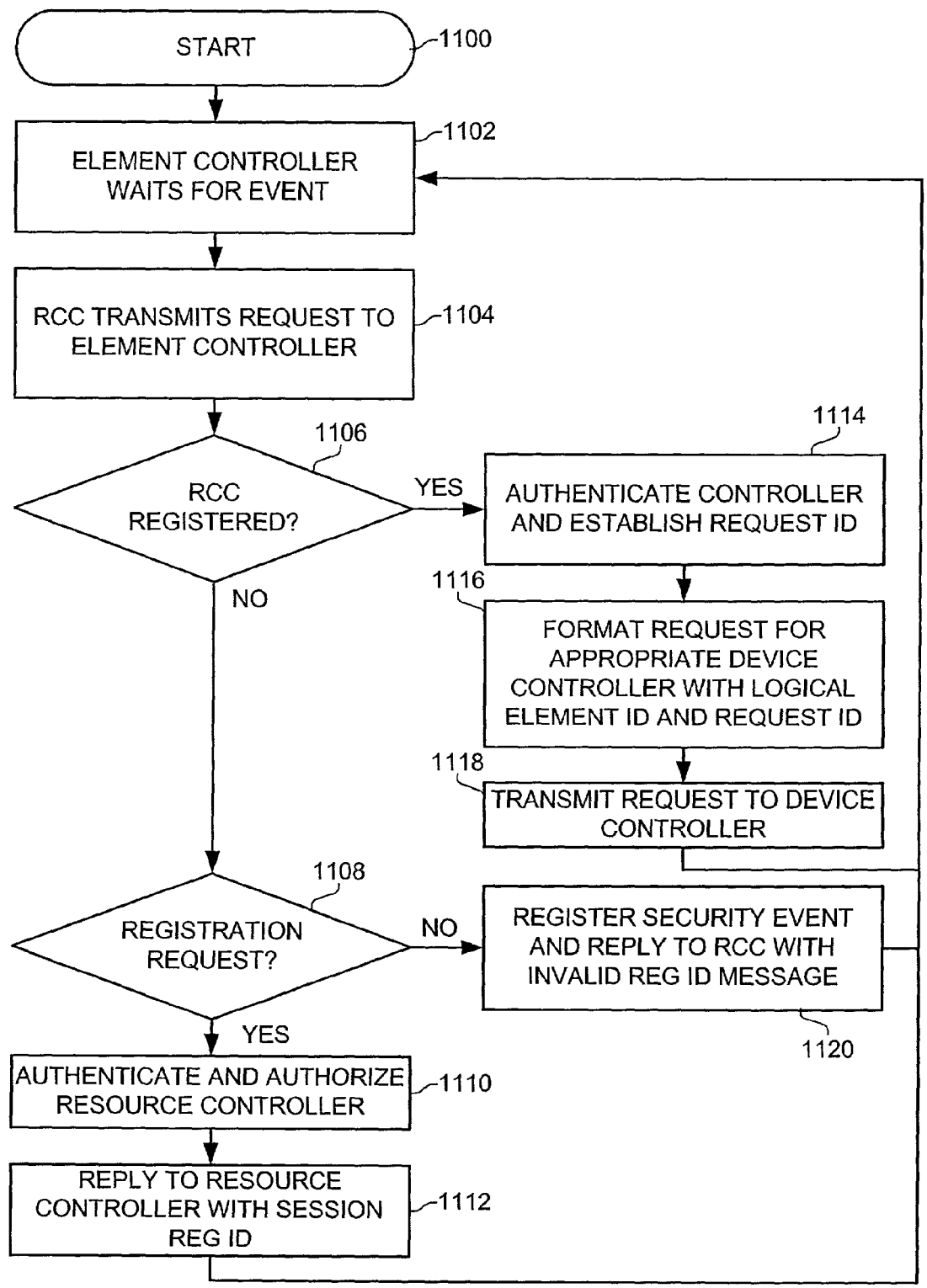
FIG. 11 is a flow chart of an element controller in an example of the invention.

FIG. 11 depicts a flow chart of an element controller in an example of the invention. FIG. 11 begins in step 1100. In this embodiment, the NRIM element controller is the element A controller process N 620. In step 1102, the element controller waits for an event. The RCC 616 transmits a request to the element controller in step 1104. The element controller determines whether the RCC 616 is registered in step 1106.

If the RCC 616 is not registered, the element controller determines whether the request is a registration request in step 1108. If the request is a registration request, the element controller authenticates and authorizes the RCC 616 in step 1110. The element controller then replies with to the RCC 616 with a session registration ID in step 1112 before returning to step 1102. If the request is not a registration request, the element controller registers a security event and replies to the RCC 616 with an invalid registration ID message.

If the RCC 616 is registered, the element controller authenticates the RCC 616 and establishes the request ID in step 1114. In step 1116, the element controller 620 then formats the request for the appropriate device controller with the logical element ID and the request ID. The element controller then transmits the request to the device controller in step 1118 before returning to step 1102.

Figure 12:
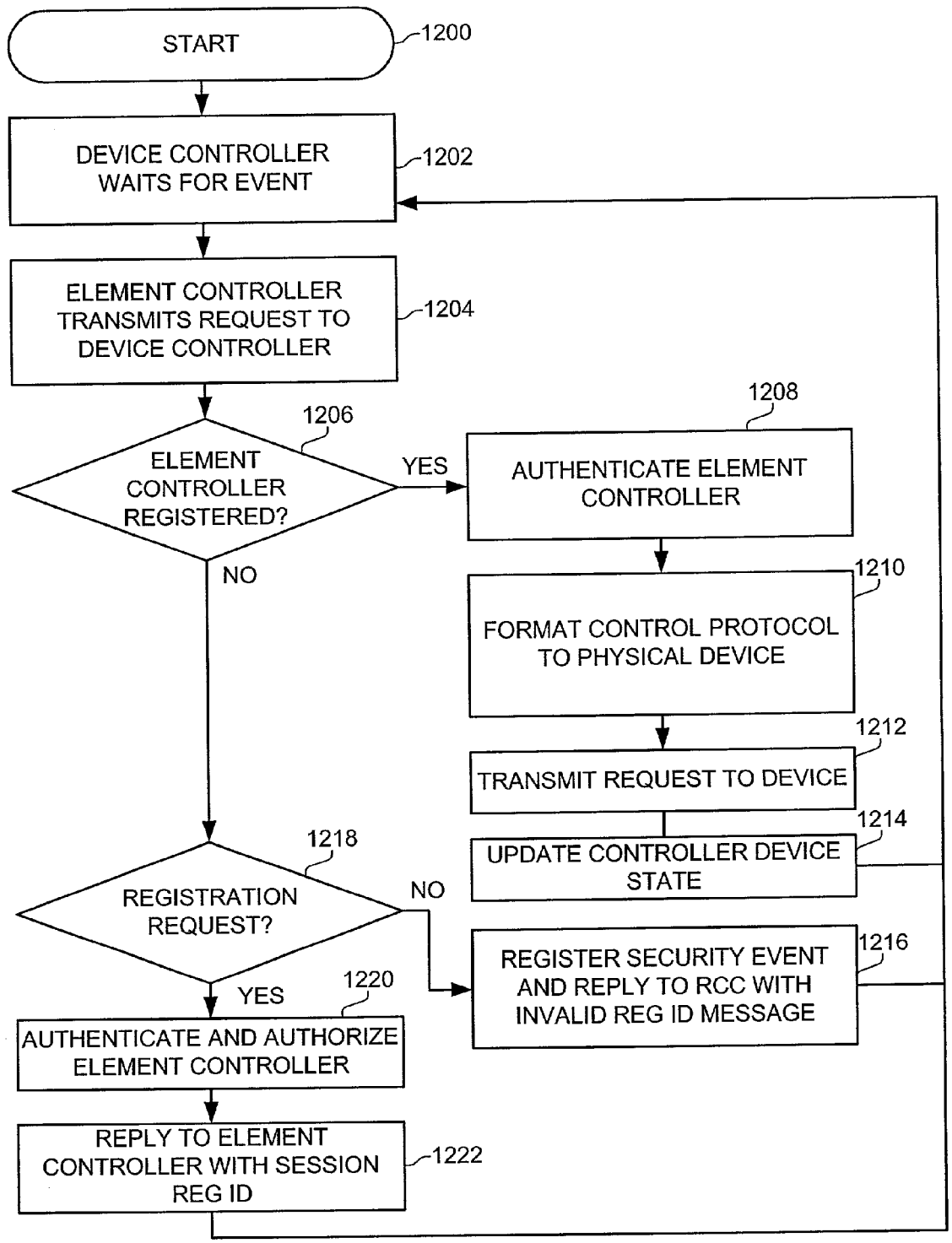
FIG. 12 is a flow chart of a device controller in an example of the invention.

FIG. 12 depicts a flow chart of a device controller in an example of the invention. FIG. 12 begins in step 1200. In this embodiment, the device controller is the device A controller process D 654. In another embodiment, the device controller is the device B controller process G 662. In step 1202, the device controller waits for an event. The element controller transmits the request to the device controller in step 1204. In step 1206, the device controller determines whether the element controller is registered in step 1206. If the element controller is registered, the device controller authenticates the element controller in step 1208. In step 1210, the device controller formats the control protocol to the physical device. The device controller then transmits the request to the network device 542 in step 1212. In step 1214, the device controller updates its state in 1214 before returning to step 1202.

If the element controller is not registered, the device controller determines whether the request is a registration request in step 1218. If the request is not a registration request, the device controller registers a security event and replies to the element controller with an invalid registration ID request before returning to step 1202. If the request is a registration request, the device controller authenticates and authorizes the element controller in step 1220. In step 1222, the device controller replies with the session registration ID to the element controller before returning to step 1202.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of operating a control interface to enforce a network architecture in a communication network wherein the control interface comprises first states of logical elements, first maps of the logical elements, second states of network devices, and second maps of the network devices wherein the logical elements represent sets of network device functions, the method comprising:

receiving an event into the control interface;

in the control interface, processing the event to identify one of the logical elements and at least one of the network devices;

in the control interface, updating the first state for the identified logical element based on the event and one of the first maps of the identified logical element; and in the control interface, updating the second state for the identified network device based on the event and one of the second maps of the identified network device;

wherein each of the first maps of the identified logical element comprises a representation of state transitions of the identified logical element; and wherein each of the second maps of the identified network device comprises a representation of state transitions of the identified network device.

2. The method of claim 1 further comprising executing an action based on the first state and the first map in response to updating the first state.

3. The method of claim 1 further comprising executing an action based on the second state and the second map in response to updating the second state.

4. The method of claim 1 further comprising transferring the event from the control interface to the identified network device.

5. The method of claim 4 further comprising formatting the event in the control interface for the identified network device.

6. The method of claim 1 further comprising configuring the identified logical element based on the event.

7. The method of claim 1 further comprising transmitting a notification of the event to a communication service manager.

8. The method of claim 1 further comprising configuring the identified network device based on the event.

9. The method of claim 8 wherein configuring the identified network device comprises executing a control protocol for the identified network device.

10. The method of claim 1 wherein the control interface further comprises device controllers for the network devices.

11. The method of claim 1 wherein the control interface further comprises element controllers for the logical elements.

12. The method of claim 1 wherein the event is a request for service from a communication service manager.

13. The method of claim 1 wherein the first state is a pointer on the first map.

14. The method of claim 1 wherein the second state is a pointer on the second map.

15. The method of claim 1 further comprising waiting for an event in the control interface.

16. A software product for operating a control interface to enforce a network architecture in a communication network wherein the control interface comprises first states of logical elements, first maps of the logical elements, second states of network devices, and second maps of the network devices wherein the logical elements represent sets of network device functions, the software product comprising:

control interface software operational when executed by a processor to direct the processor to receive an event, process the event to identify one of the logical elements and at least one of the network devices, update the first state for the identified logical element based on the event and one of the first maps of the identified logical element, and update the second state for the identified network device based on the event and one of the second maps of the identified network device, wherein each of the first maps of the identified logical element comprises a representation of state transitions of the identified logical element, and wherein each of the second maps of the identified network device comprises a representation of state transitions of the identified network device; and a software storage medium operational to store the control interface software.

17. The software product of claim 16 wherein the control interface software is operational when executed by the processor to direct the processor to execute an action based on the first state and the first map in response to updating the first state.

18. The software product of claim 16 wherein the control interface software is operational when executed by the processor to direct the processor to execute an action based on the second state and the second map in response to updating the second state.

19. The software product of claim 16 wherein the control interface software is operational when executed by the processor to direct the processor to transfer the event from the control interface to the identified network device.

20. The software product of claim 19 wherein the control interface software is operational when executed by the processor to direct the processor to format the event in the control interface for the identified network device.

21. The software product of claim 16 wherein the control interface software is operational when executed by the processor to direct the processor to configure the identified logical element based on the event.

22. The software product of claim 16 wherein the control interface software is operational when executed by the processor to direct the processor to transmit a notification of the event to a communication service manager.

23. The software product of claim 16 wherein the control interface software is operational when executed by the processor to direct the processor to configure the identified network device based on the event.

24. The software product of claim 23 wherein the control interface software is operational when executed by the processor to direct the processor to execute a control protocol for the identified network device.

25. The software product of claim 16 wherein the control interface further comprises device controllers for the network devices.

26. The software product of claim 16 wherein the control interface further comprises element controllers for the logical elements.

27. The software product of claim 16 wherein the event is a request for service from a communication service manager.

28. The software product of claim 16 wherein the first state is a pointer on the first map.

29. The software product of claim 16 wherein the second state is a pointer on the second map.

30. The software product of claim 16 further comprising waiting for an event in the control interface.

31. A control interface to enforce a network architecture in a communication network, the control interface comprising:

first states of logical elements;

first maps of the logical elements;

second states of network devices;

second maps of the network devices wherein the logical elements represent sets of network device functions;

a processor configured to receive an event, process the event to identify one of the logical elements and at least one of the network devices, update the first state for the identified logical element based on the event and one of the first maps of the identified logical element, and update the second state for the identified network device based on the event and one of the second maps of the identified network device, wherein each of the first maps of the identified logical element comprises a representation of state transitions of the identified logical element, and wherein each of the second maps of the identified network device comprises a representation of state transitions of the identified network device; and an interface configured to transfer the event to the processor.

32. The control interface of claim 31 wherein the processor is configured to execute an action based on the first state and the first map in response to updating the first state.

33. The control interface of claim 31 wherein the processor is configured to execute an action based on the second state and the second map in response to updating the second state.

34. The control interface of claim 31 wherein the processor is configured to transfer the event to the interface and the interface is configured to transfer the event from the processor to the identified network device.

35. The control interface of claim 34 wherein the processor is configured to format the event for the identified network device.

36. The control interface of claim 31 wherein the processor is configured to configure the identified logical element based on the event.

37. The control interface of claim 31 wherein the processor is configured to transmit a notification of the event to a communication service manager.

38. The control interface of claim 31 wherein the processor is configured to configure the identified network device based on the event.

39. The control interface of claim 31 wherein the processor is configured to execute a control protocol for the identified network device.

40. The control interface of claim 31 wherein the control interface further comprises device controllers for the network devices.

41. The control interface of claim 31 wherein the control interface further comprises element controllers for the logical elements.

42. The control interface of claim 31 wherein the event is a request for service from a communication service manager.

43. The control interface of claim 31 wherein the first state is a pointer on the first map.

44. The control interface of claim 31 wherein the second state is a pointer on the second map.

45. The control interface of claim 31 wherein the processor is configured to wait for an event in the control interface.

* * * * *